United States Patent

[11] 3,609,628

[72] Inventor Louis Cabaussel
 Villeurbanne, France
[21] Appl. No. 865,558
[22] Filed Oct. 13, 1969
[45] Patented Sept. 28, 1971
[73] Assignee Societe "Lucien Ferraz & cie"
 Rhone, France

[54] CURRENT-TRANSMITTING DEVICES FOR THE AXLES OF ELECTRIC RAILWAY VEHICLES
 7 Claims, 8 Drawing Figs.

[52] U.S. Cl. .................................................. 339/3
[51] Int. Cl. ..................................................... H01r 39/64
[50] Field of Search ........................................... 339/3, 5, 8, 7, 9; 105/53, 54

[56] References Cited
 UNITED STATES PATENTS
 1,244,533  10/1917  Morse ......................... 339/7 X FOREIGN PATENTS
893,306  10/1950  Germany..................... 339/3

Primary Examiner—Richard E. Moore
Attorney—Alexander & Dowell

ABSTRACT: A current-transmitting device interposed between the frame of an electric railway vehicle and an axle comprises a nonrotating member and a rotating member resiliently urged against the nonrotating member so as to form therewith a rotating contact unit. The said unit is carried by the frame in front of one of the ends of the axle and the rotating member is mechanically coupled with the axle end by a universal coupling so as to rotate in unison therewith in spite of the various displacements of the axle with respect to the frame. A flexible conductor forms a deformable electric connection between the rotating member and the axle end.

PATENTED SEP 28 1971 3,609,628

INVENTOR.
Louis Cabaussel
BY Alexander D...
attorneys

CURRENT-TRANSMITTING DEVICES FOR THE AXLES OF ELECTRIC RAILWAY VEHICLES

This invention relates to current transmitting devices mounted in electric railway vehicles, between the frame and the axles, in order that electric current may directly flow from the frame to the wheels without having to pass through the axle bearings.

The role of these devices is extremely important in high-power locomotives since otherwise the axle bearings would be rapidly destroyed. But of course the said devices should operate satisfactorily in spite of the relative displacements of the axles with respect to the frame. Moreover these devices generally comprise a rotating contact mechanism including at least one brush resiliently applied against a rotating surface and of course this brush should wear uniformly in such manner that the whole contacting area between the brush and the rotating surface may be maintained during the whole useful life of the brush.

In railways vehicles comprising axle boxes disposed at the ends of the axles, each nonrotating axle box follows the vertical displacements of the corresponding axle and also its angular displacements about an axis longitudinal with respect to the track (when one wheel rises more than the other with respect to the frame). The relative displacements to be taken into account are thus limited to the to-and-fro motion of the axle along its own axis (i.e., transversely with respect to the track). It is therefore relatively easy, at least at moderate speeds, to provide current transmitting devices in which a brush is always uniformly applied against a flat rotating contact member (end face of the axle or contacting plate secured thereto). But when the axle boxes or bearings are mounted between the wheels, the current-transmitting devices are carried by supports fixed to the frame and therefore they must take into account all the kinds of movements of the axle relatively to the frame. Under such conditions with the known arrangements the brushes do not bear uniformly against the rotating contact member. The wear of their contacting end is therefore irregular, this end is no more flat but more or less rounded and the contacting area becomes considerably reduced, whereby the ohmic resistance to the passage of electric current is increased and the undesirable eddy currents which flow through the axle bearings become quite noticeable.

It is the principal object of the present invention to provide a current-transmitting device adapted to be disposed between the frame and an axle in a railway vehicle, which will be substantially unaffected by the relative displacements of the axle with respect to the frame.

In accordance with the present invention, in a current transmitting device adapted for current transmission between the frame and an axle in an electric railway vehicle, of the kind comprising a nonrotating member and a rotating member resiliently urged against each other so as to form a rotating contact mechanism, the rotating contact mechanism is wholly carried by the frame, its rotating member being mechanically coupled with the adjacent end of the axle by a universal coupling so as to rotate in unison therewith, and being electrically connected with the said axle by a flexible conductor. In the accompanying drawings:

Figure 1:
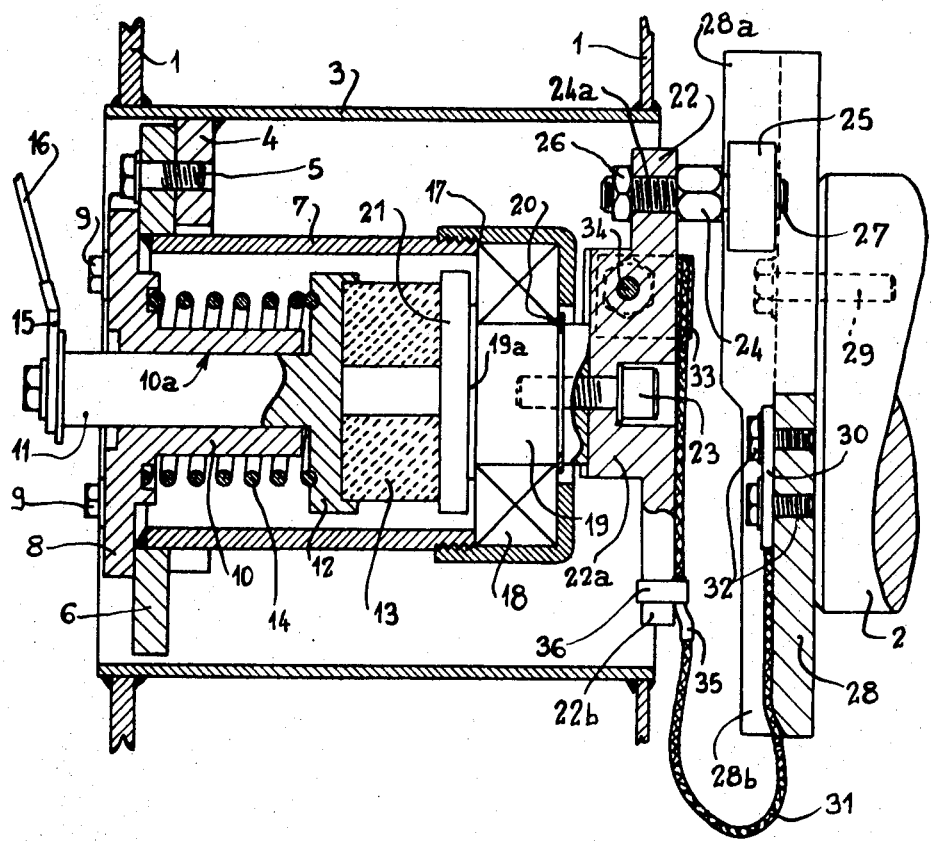
FIG. 1 is a general vertical section of a current transmitting device according to the invention.

In FIG. 1 reference numeral 1 designates a side member forming part of a railway vehicle frame. This side member is in the form of a hollow beam and it comprises in front of each axle, such as 2, an open-ended horizontal sleeve 3 which forms a tubular stay between the walls or webs of the said member, while permitting free access to the adjacent end of the axle 2. This axle 2 is rotatably mounted in suitable bearings or axle boxes disposed between the wheels carried by the axle, the said wheels and the said bearings being not illustrated in the drawing. The axle bearings are connected with the frame by suspension springs in the conventional manner and therefore the axle may move with respect to the frame in a vertical direction, in a direction transverse to the track, and also angularly about an axis longitudinal to the track, when the vertical displacements of the wheels are unequal.

Figures 2, 6:
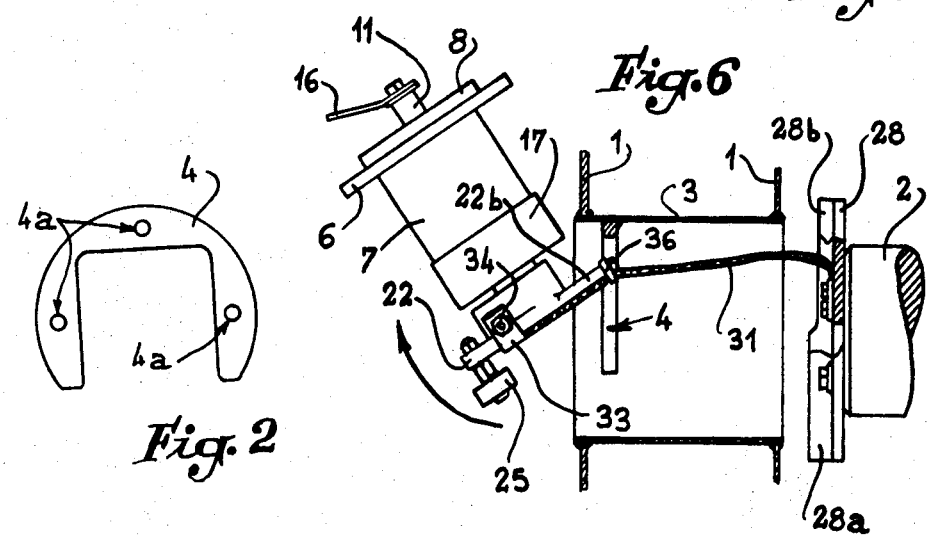
FIG. 2 is a small scale front view of the horseshoe-shaped supporting flange adapted to support the rotating contact mechanism of the device.
FIG. 6 is a small scale view showing how the current transmitting device may be removed from the frame.

In the embodiment illustrated in Fig. 1, an inner annular supporting flange 4 is welded in sleeve 3, near the outer end thereof. This flange is somewhat in the shape of a downwardly opening horseshoe as shown in Fig. 2 with a circular outer edge and a substantially square inner edge. Three screw-threaded holes 4a provided in the said flange receive screws 5 (FIG. 1) which clamp against the outer side of flange 4 another flange 6, of annular shape to the inner edge of which is welded the outer end (i.e. the end remote from axle 2) of a hollow cylindrical body 7. This outer end is closed by a circular plate or cover 8 secured to the outer side of flange 6 by means of screws 9. Cover 8 is formed with a central cylindrical boss 10 which extends inwardly within the hollow body 7, this boss having a square axial bore 10a which slidably receives a rod 11 of complementary square cross section. The inner end of this rod 11 is integral with a circular plate 12 which carries a brush 13, made for instance of a mixture of carbon and metallic salts or metal particles. A compression spring 14 is disposed around boss 10 between cover 8 and plate 12. The other end of rod 11 receives the terminal eyelet or plug 15 of a flat braided conductor 16 connected with an appropriate point (not illustrated) of the vehicle frame.

An annular cup-shaped cap 17 is screwed onto the inner end of the hollow cylindrical body 7, the outer race of an antifriction bearing 18 (as for instance a ball bearing) being clamped between the bottom of cap 17 and the annular end face of body 7, as shown. The inner race of this bearing receives a short shaft 19 on which it is maintained between a shoulder 19a and a split washer 20 inserted into an appropriate groove of the shaft. The end of shaft 19 which faces brush 13 is integral with a circular contacting plate 21 against which the said brush is applied by the reaction of spring 14. The other end of shaft 19 extends slightly beyond bearing 20 and cap 17, and it carries the hub portion 22a of a crank arm 22, the said portion being secured to the shaft by means of an axial screw 23 and of a system of grooves and ribs which prevent any angular displacement of arm 22 with respect to shaft 19. Arm 22 carries an inwardly extending crankpin 24 which supports a freely rotatable roller 25. As illustrated this crankpin 24 has a screw-threaded tail portion 24a which extends through arm 22, its screw-threaded protruding end receiving a securing nut 26. As to roller 25, it may be supported on pin 24 in any appropriate manner, as for instance by means of a ball bearing retained in position by a split washer 27, the outer race of this ball bearing forming directly the rim of the roller.

The hub portion 22a is also integral with another arm 22b diametrically opposed to the crank arm 22 and which may be considered as an extension of the latter beyond the said hub portion 22a.

Figure 3:
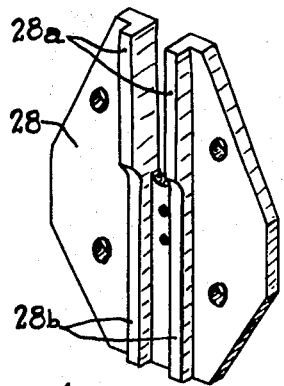
FIG. 3 is a perspective view of the slotted plate secured onto the axle end.
Figure 4:
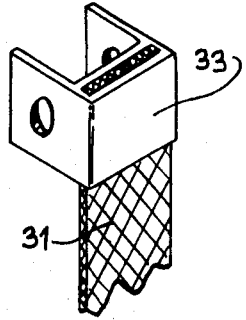
FIG. 4 is a fragmental perspective view of the flat flexible conductor interposed between the rotating member of the rotating contact mechanism and the slotted plate, the said view showing the end of the conductor adapted to be secured to the crank arm of the universal coupling.
Figure 5:
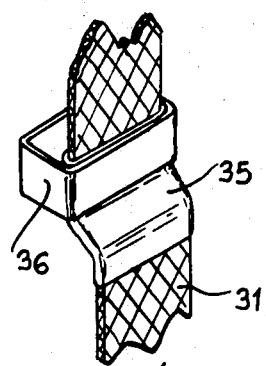
FIG. 5 is a perspective view of the portion of this braided conductor which comprises a ring adapted to be fixed to the said rotating member.

A driving plate 28 is mounted against the end face of axle 2 by means of screws 29. As clearly shown in Fig. 3 the outer side of this plate (i.e. the side thereof which is not applied against the end of axle 2) is formed with a pair of parallel ribs 28a between which plate 28 is slotted and these ribs extend beyond the central portion of the plate in the form of ribs 28b of smaller height between which the plate is unslotted. Roller 25 disposed between ribs 28a in such manner as to form an angular connection between plate 28 and crank arm 22. One of the ends of a flat braided conductor 31 is disposed between the lower ribs 28b of the plate 28 where it is clamped against the latter by means of screws 31. This conductor extends radially between ribs 28b and it is thereafter folded at 180° in order to extend on arm 22b, on hub portion 22a and on crank arm 22 itself, its end being soldered to a U-shaped connecting member or plug 33 (see Fig. 4) which overlaps arm 22 to which it is secured by means of a transverse bolt 34 (FIG. 1). A flat sleeve 35 (Figs. 1 and 5) is soldered on conductor 31 in the zone thereof adjacent to the end of arm 22b and this sleeve is integral with a laterally protruding ring 36 adapted to be threaded on arm 22b (FIG. 1).

When the axle 2 rotates, plate 28, crankpin 24 and crank arm 22 form a universal coupling between axle 2 and shaft 19 of the rotating contact mechanism 21-13-11-14. Shaft 19 therefore rotates in unison with axle 2, while brush 13, resiliently applied against the contacting plate 21, is prevented from rotating by rod 11 which is angularly retained within bore 10a owing to its square cross section. The electric current flows from the frame to the axle through conductor 16, rod 11, plate 12, brush 13, contacting plate 21, shaft 19, hub portion 22a, crank arm 22, conductor 31 and plate 28. The nonrotating brush 13 and the rotating contacting plate are always coaxial since the plate carrying shaft 19 is centered by the antifriction bearing 18 with respect to the hollow body 7 which carries outer cover 8 with its cylindrical boss 10 wherein the brush-carrying rod 11 is slidably retained. The transmission of the electric current between the frame and the axle is thus always perfectly realized whatever may be the relative displacements of the axle with respect to the frame, crank arm 22, roller 25 and plate 28 forming a universal coupling. More particularly, even if spring 14 is relatively light, the axle displacements in a transverse direction with respect to the track have no influence whatever on the contacting surfaces even at high speeds for which the corresponding transverse accelerations of the axle may be considerable. Furthermore the brush wears uniformly in spite of the angular movements of the axle about an axis longitudinal to the track.

When it is desired to have free access to the brush, it is sufficient to remove screws 9 and to pull cover 8 which carries boss 10 together with the longitudinally movable unit 11-12-13 (the rotatably movable unit 21-19-22 being still carried by bearing 18, cap 17 and body 7).

In order to have access to the rotatably movable unit 21-19-22 (more particularly to bearing 18 or to conductor 31), screws 5 are first removed and the said unit is pulled outwardly until conductor 31 is taut between terminal 30 and sleeve 35. The unit may then be tilted upwardly as indicated by the arrow in Fig. 6. It is to be noted that owing to the open lower end of flange 4 (see FIG. 2), it is always possible to bring arms 22 and 22b to such a position that they may pass through the said flange. The transverse bolt 34 may then be removed and the retaining ring 36 may be disengaged from arm 22b. The hollow body 7 is thus fully liberated together with the parts which it carries. The remounting operation is effected in the reverse order, i.e. by threading ring 36 on arm 22b, mounting bolt 34, reintroducing body 7 into sleeve 3, orientating arm 22 in such manner that roller 25 may be inserted into the slideway formed by ribs 28a of plate 28, and finally mounting screws 5.

It may be remarked that the end of conductor 31 opposed to axle 2 could be directly secured to arm 22b, but of course in such a manner that it may be easily liberated at the position of Fig. 6.

Figure 7:
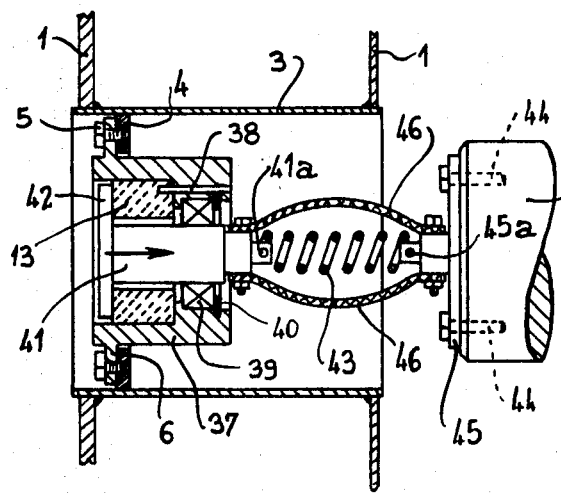
FIGS. 7 and 8 are axial sections illustrating two modified embodiments of the invention.

In the embodiment of FIG. 7 the removable flange 6 is integral with a relatively thick hollow body 37 having two successive bore portions of different diameters. An annular brush 13 is engaged into the outer portion of the bore of body 37, i.e. in the portion thereof which opens outwardly with respect to the vehicle frame, where it is angularly retained by means of a pin 38, while the outer race of a ball bearing 39 is mounted in the inner portion, of smaller diameter, of the said bore, between a central shoulder and a split ring 40 inserted into an appropriate annular groove of the bore. A shaft 41 is mounted with relatively slight friction in the inner race of this ball bearing 39. This shaft 41 extends through the central bore of brush 13 and its outer end is formed with a contacting plate 42 which bears against the said brush 13. The inner end of shaft 41 has a central lug 41a to which is attached one end of a traction spring 43. Screws 44 clamp against the end of axle 2 a plate 45 having a central 45a to which the other end of spring 43 is attached. Braided conductors 46 connect electrically plate 45 and shaft 41 with each other.

It will be understood that spring 43 maintains plate 42 applied against brush 13 in spite of the relative displacements of axle 2, while simultaneously forming a resilient universal coupling owing to which shaft 41 rotates in unison with the said axle. Here again current is transmitted without any noticeable ohmic resistance between the frame and the axle. The terminal eyelet 15 (Fig. 1) of conductor 16 may be fixed to any appropriate point of the device, as for instance under the head of one of screws 5.

Figure 8:
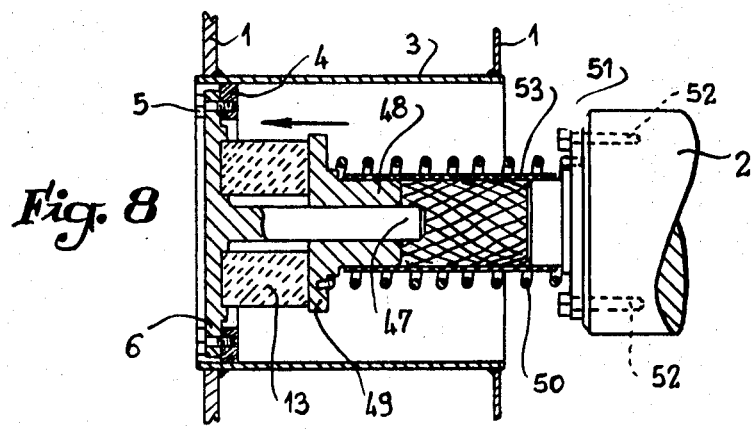

Fig. 8 shows a modification of the embodiment of FIG. 7, wherein the spring operates by compression. The annular brush 13 is secured in any appropriate manner to the inner side of the cover 6 of the device. This cover is here formed with an inwardly directed gudgeon 47 of the circular cross section, on which is rotatably mounted the hub 48 of a contacting plate 49. In FIG. 8 hub 48 is directly carried by pin 47 but it could also be supported by the outer race of a ball bearing or the like the inner race of which would be mounted with slight friction on the said pin. The compression spring 50 extends between plate 49 and another plate 51 fixed against the end of axle 2 by means of screws 52. The ends of spring 50 are bent at right angles and are inserted into holes provided in plates 49 and 51 in order that the said spring may play the role of a resilient universal coupling between the contacting plate 51 and axle 2. A tubular braided conductor 53 forms a low-resistance electric connection between hub 48 and a central boss provided on plate 51 for centering the corresponding end of spring 50. Here again the terminal eyelet or plug 15 of conductor 16 may be clamped under the head of a screw 5.

It is obvious that in the rotating contact device formed by the brush 13 and the corresponding contacting plate such as 21, the rotating member could be the brush, the nonrotating member being the plate. Instead of a single brush, as shown, two or more may be used, if desired.

I claim:

1. In an electric railway vehicle having a frame and rotating axles to support said frame with each of said axles having two ends, a device for current transmission between said frame and one of the ends of said axles, said device comprising:
   a nonrotating contacting member carried by said frame substantially in front of said one end of said one of said axles;
   a rotating contacting member engaging said nonrotating contacting member;
   means on said frame to rotatably support said rotating contacting member;
   spring means to resiliently urge said nonrotating contacting member and said rotating contacting member against each other to maintain same in permanent electric sliding contact;
   universal coupling means between said rotating contacting member and said one end of said one of said axles to cause said rotating contacting member to rotate in unison therewith in spite of the displacements of said one of said axles with respect to said frame;
   and flexible conductor means to electrically connect said rotating contact member with said one end of said one of said axles.

2. In a current-transmitting device as claimed in claim 1, said rotating member including a shaft having a first and a second end, and a flat contacting plate carried by said first end of said shaft, said nonrotating member being formed of a support and of at least one brush slidably carried by said support to engage said contacting plate with said spring means acting on said brush to apply same against said plate, said device further comprising means to prevent said brush from rotating together with said plate, and said universal coupling means acting on the second end of said shaft.

3. In a current-transmitting device as claimed in claim 2, a flexible conductor means between said brush and said support.

4. In a current-transmitting device as claimed in claim 2, said one of said axles having a mean position with respect to said frame, said shaft being substantially coaxial to a said mean position, and said universal coupling means comprising a driving member secured to said one end of said one of said axles, said driving member being formed with a guiding slot radially disposed with respect to said one of said axles; a crank arm radially secured to said second end of said shaft, said crank arm having an outer end; and a crankpin carried by the outer end of said crank arm, said crankpin being slidably engaged into said slot.

5. In a current-transmitting device as claimed in claim 2, said frame including an open-ended sleeve in front of said one end of said one of said axles, with an outer end remote from said one end of said one of said axle and an inner end adjacent to said one end, said support of said nonrotating contacting member being removable secured to the outer end of said sleeve, and said means to rotatably support said rotating contacting member being comprised of bearing means carried by said support and in which the shaft of said rotating contacting member is mounted.

6. In a current-transmitting device as claimed in claim 1:
said frame including an open-ended sleeve disposed in front of said one end of said one of said axles said sleeve having an outer end remote from said one end of said one of said axles and an inner end adjacent to said one end;
said device further comprising a tubular body disposed within said sleeve, said body having a first open end removably secured to the outer end of said sleeve and a second end;
said means to rotatably support said rotating contacting member being comprised of bearing means carried by the second end of said tubular body;
said rotating contacting member including a shaft mounted in said bearing means and a contacting end plate supported by said shaft within said tubular body;
said nonrotating contacting means including a brush applied against said contacting end plate within said tubular body, a tail carrying said brush, said tail having a noncircular cross section, and a removable cover closing the first end of said tubular body, said cover being formed with an axial perforation having a cross section complementary of the cross section of said tail and through which said tail is slidably guided;
said spring means being inserted between said cover and said brush;
and said device also comprising flexible conductor means between said tail and said frame.

7. In a current-carrying device as claimed in claim 1, said spring means being disposed between said rotating contacting member and said one end of said one of said axles so as to form said universal coupling means.